(12) United States Patent
Lee et al.

(10) Patent No.: US 9,860,515 B2
(45) Date of Patent: Jan. 2, 2018

(54) APPARATUS AND METHOD FOR 3D CONTENT BROADCASTING WITH BOUNDARY INFORMATION

(71) Applicants: Electronics and Telecommunications Research Institute, Daejeon (KR); Hidea Solutions Co., Ltd, Seoul (KR); Kookmin University Industry Academy Cooperation Foundation, Seoul (KR)

(72) Inventors: Joo Young Lee, Daejeon (KR); Sung Hoon Kim, Daejeon (KR); Hyon Gon Choo, Daejeon (KR); Jin Soo Choi, Daejeon (KR); Jin Woong Kim, Daejeon (KR); Suk Jin Hong, Seoul (KR); Dong Wook Kang, Seoul (KR); Kyeong Hoon Jung, Seoul (KR)

(73) Assignees: Electronics and Telecommunications Research Institute, Daejeon (KR); Hidea Solutions Co., Ltd., Seoul (KR); Kookmin University Industry Academy Cooperation Foundation, Seoul (KR)

(*) Notice: Subject to any disclaimer, the term of this patent is extended or adjusted under 35 U.S.C. 154(b) by 598 days.

(21) Appl. No.: 14/103,436

(22) Filed: Dec. 11, 2013

(65) Prior Publication Data

US 2014/0160240 A1 Jun. 12, 2014

(30) Foreign Application Priority Data

Dec. 11, 2012 (KR) .................. 10-2012-0143485
Jan. 31, 2013 (KR) .................. 10-2013-0011237
Sep. 2, 2013 (KR) .................. 10-2013-0104772

(51) Int. Cl.
*H04N 13/00* (2006.01)
*H04N 13/04* (2006.01)

(52) U.S. Cl.
CPC ..... *H04N 13/0066* (2013.01); *H04N 13/0452* (2013.01); *H04N 13/0497* (2013.01)

(58) Field of Classification Search
CPC .................................................. H04N 13/0007
See application file for complete search history.

(56) References Cited

U.S. PATENT DOCUMENTS

| 8,089,507 | B2* | 1/2012 | Ikeda | G11B 20/1251 348/42 |
| 8,111,758 | B2* | 2/2012 | Yun | H04N 13/004 348/385.1 |
| 8,248,461 | B2* | 8/2012 | Lee | H04N 13/0048 348/51 |

(Continued)

*Primary Examiner* — Jay Patel
*Assistant Examiner* — Irfan Habib
(74) *Attorney, Agent, or Firm* — William Park & Associates Ltd.

(57) ABSTRACT

A boundary information providing apparatus may include a boundary information generation unit to generate boundary information of a video, the boundary information through which a switching point between a 2D video and a 3D video is recognized, based on a switching mode between the 2D video and the 3D video, and a stream transmission unit to transmit a stream including the boundary information to a video receiving apparatus.

8 Claims, 7 Drawing Sheets

(56) References Cited

U.S. PATENT DOCUMENTS

| | | | | |
|---|---|---|---|---|
| 8,767,041 B2* | 7/2014 | Yun | H04N 13/0048 | 348/42 |
| 8,773,505 B2* | 7/2014 | Nandhakumar | H04N 13/0029 | 348/43 |
| 8,917,314 B2* | 12/2014 | Yun | H04N 13/0048 | 348/43 |
| 9,013,548 B2* | 4/2015 | Suh | H04N 13/0048 | 348/43 |
| 9,019,343 B2* | 4/2015 | Tsukagoshi | H04N 13/0059 | 348/43 |
| 9,088,817 B2* | 7/2015 | Suh | H04N 13/0066 | |
| 9,118,896 B2* | 8/2015 | Tsuruga | H04N 13/0051 | |
| 9,124,874 B2* | 9/2015 | Chen | H04N 13/0059 | |
| 9,131,215 B2* | 9/2015 | Kim | H04N 7/083 | |
| 9,185,386 B2* | 11/2015 | Ozawa | H04N 13/0059 | |
| 9,313,442 B2* | 4/2016 | Cho | H04N 5/44513 | |
| 9,357,196 B2* | 5/2016 | Suh | H04N 21/2362 | |
| 9,357,200 B2* | 5/2016 | Uesaka | H04N 13/0062 | |
| 9,392,252 B2* | 7/2016 | Suh | H04N 13/0029 | |
| 9,456,194 B2* | 9/2016 | Mochinaga | H04N 13/0454 | |
| 9,473,759 B2* | 10/2016 | Mochinaga | H04N 13/0059 | |
| 9,560,337 B2* | 1/2017 | Hong | H04N 21/23432 | |
| 9,571,815 B2* | 2/2017 | Yang | H04N 13/0022 | |
| 9,596,449 B2* | 3/2017 | Tsukagoshi | H04N 19/597 | |
| 9,602,798 B2* | 3/2017 | Suh | H04N 13/0011 | |
| 9,681,117 B2* | 6/2017 | Suh | H04N 13/0059 | |
| 9,693,033 B2* | 6/2017 | Tsukagoshi | H04N 19/597 | |
| 2006/0279750 A1* | 12/2006 | Ha | H04N 13/0454 | 358/1.2 |
| 2007/0242068 A1* | 10/2007 | Han | H04N 13/0409 | 345/427 |
| 2008/0303832 A1* | 12/2008 | Kim | G09G 3/003 | 345/501 |
| 2009/0220213 A1* | 9/2009 | Ogawa | G11B 27/10 | 386/241 |
| 2009/0310016 A1* | 12/2009 | Fukuda | H04N 5/4401 | 348/441 |
| 2010/0045780 A1* | 2/2010 | Kwon | H04N 13/0048 | 348/51 |
| 2010/0074594 A1* | 3/2010 | Nakamura | H04N 13/007 | 386/241 |
| 2010/0134603 A1* | 6/2010 | Itoh | H04N 13/007 | 348/58 |
| 2011/0043614 A1* | 2/2011 | Kitazato | H04N 13/0059 | 348/51 |
| 2011/0063411 A1* | 3/2011 | Kitazato | H04N 13/0059 | 348/42 |
| 2011/0221871 A1* | 9/2011 | Sakaniwa | H04N 13/0029 | 348/51 |
| 2011/0261155 A1* | 10/2011 | Tsuruga | H04N 13/0051 | 348/43 |
| 2011/0273541 A1* | 11/2011 | Kitazato | H04N 13/0059 | 348/51 |
| 2012/0120194 A1* | 5/2012 | Newton | H04N 13/0059 | 348/43 |
| 2014/0375764 A1* | 12/2014 | Choe | H04N 13/007 | 348/43 |

* cited by examiner

APPARATUS AND METHOD FOR 3D CONTENT BROADCASTING WITH BOUNDARY INFORMATION

CROSS-REFERENCE TO RELATED APPLICATIONS

This application claims the benefit of Korean Patent Application No. 10-2012-0143485 filed on Dec. 11, 2012, and Korean Patent Application No. 10-2013-0011237 filed on Jan. 31, 2013, and Korean Patent Application No. 10-2013-0104772 filed on Sep. 2, 2013, in the Korean Intellectual Property Office, the disclosures of which are incorporated herein by reference.

BACKGROUND

1. Field of the Invention

A following description relates to a boundary information providing apparatus, and more particularly, to a boundary information providing apparatus that transmits, to a receiver, information on a time point at which a two-dimensional (2D) video is switched into a three-dimensional (3D) video or the 3D video is switched into the 2D video in a 3D program including both the 2D video and the 3D video, thereby enabling the receiver to perform switching between the 2D video and the 3D video at a proper time.

2. Description of the Related Art

A binocular three-dimensional (3D) broadcasting system transmits streams with respect to a left eye image and a right eye image, simultaneously, to a receiver to provide a 3D broadcasting service. The receiver receiving the streams of the left eye image and the right eye image may provide a stereoscopic image to a viewer through 3D rendering. In case of the 3D broadcasting, the receiver may provide the 3D broadcasting only during a particular time period. Here, the receiver needs to properly perform switching between 2D and 3D corresponding to whether a currently provided program is 2D broadcasting or 3D broadcasting.

A conventional 3D broadcasting system uses a signaling channel of a transport level, such as program map table (PMT), virtual channel table (VCT), and service information (SI), to provide information on a currently provided broadcasting program type, for example 2D or 3D. Here, the 3D broadcasting system may insert type information in a descriptor using the signaling channel, and transmit the descriptor including the type information to the receiver. The foregoing method is generally used for transmission of program information since the signaling is easy to define and other program information may also be transmitted.

However, since the descriptor is transmitted at time periods to the receiver, it is difficult to transmit boundary information of an accurate level. A frame header may be used to solve the inaccuracy. According to a method using the frame header, the type information, that is, 2D or 3D, of a corresponding frame is inserted in the frame header of a video level and therefore boundary information may be transmitted in an accurate frame unit.

However, since the signaling channel such as PMT, VCT, and SI is mainly used as to information on a program being broadcasted, information on whether the currently provided program is a 3D type is provided also in the descriptor form through the signaling descriptor. On the other hand, information on the video frame header may be selectively used. To use the video frame header, two information should not conflict at a boundary between a 2D program and a 3D program.

Especially, when two broadcasting networks capable of providing different 2D services are used to transmit the left image and the right image of the 3D broadcasting, the receiver need to be prevented from synthesizing of a 3D video from two totally different 2D videos.

SUMMARY

An aspect of the present invention provides a boundary information providing apparatus and a video receiving apparatus capable of switching three-dimensional (3D) broadcasting into a two-dimensional (2D) video and a 3D video at a proper time based on boundary information received by the video receiving apparatus, by generating the boundary information related to a time point at which the 2D video is switched into the 3D video or the 3D video is switched into the 2D video and by transmitting the boundary information to the video receiving apparatus, in a 3D program including both the 2D video and the 3D video.

According to an aspect of the present invention, there is provided a boundary information providing apparatus of a 3D broadcasting, the apparatus including a boundary information generation unit to generate boundary information of a video, the boundary information through which a switching point between a of a 2D video and a 3D video is recognized, based on a switching mode between the 2D video and the 3D video; and a stream transmission unit to transmit a stream including the boundary information to a video receiving apparatus.

According to another aspect of the present invention, there is provided a video receiving apparatus including a boundary information extraction unit to receive a stream from a boundary information providing apparatus and to extract boundary information included in the stream; and a video switching unit to perform switching between a 3D video and a 2D video based on the boundary information, wherein the boundary information includes information through which a switching point between the 2D video and the 3D video may be recognized, based on a switching mode between the 2D video and the 3D video and is generated based on at least one of a transport level descriptor mode and a video frame header information mode.

According to another aspect of the present invention, there is provided a boundary information providing method of a 3D broadcasting, the method including generating boundary information of a video, the boundary information through which a switching point between a 2D video and a 3D video is recognized based on a switching mode of the 2D video and the 3D video; and transmitting a transmission stream including the boundary information to a video receiving apparatus.

According to another aspect of the present invention, there is provided a video receiving method including receiving a stream from a boundary information providing apparatus and extracting boundary information included in the stream; and performing switching between a 3D video and a 2D video based on the boundary information, wherein the boundary information includes information through which a switching point between the 2D video and the 3D video may be recognized, based on a switching mode between the 2D video and the 3D.

EFFECT

According to embodiments of the present invention, a boundary information providing apparatus may switch three-dimensional (3D) broadcasting into a two-dimensional (2D) video and a 3D video at a proper time based on boundary information received by a video receiving apparatus, by generating the boundary information related to a time point at which the 2D video is switched into the 3D video or the 3D video is switched into the 2D video and by transmitting the boundary information to the video receiving apparatus, in a 3D program including both the 2D video and the 3D video.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
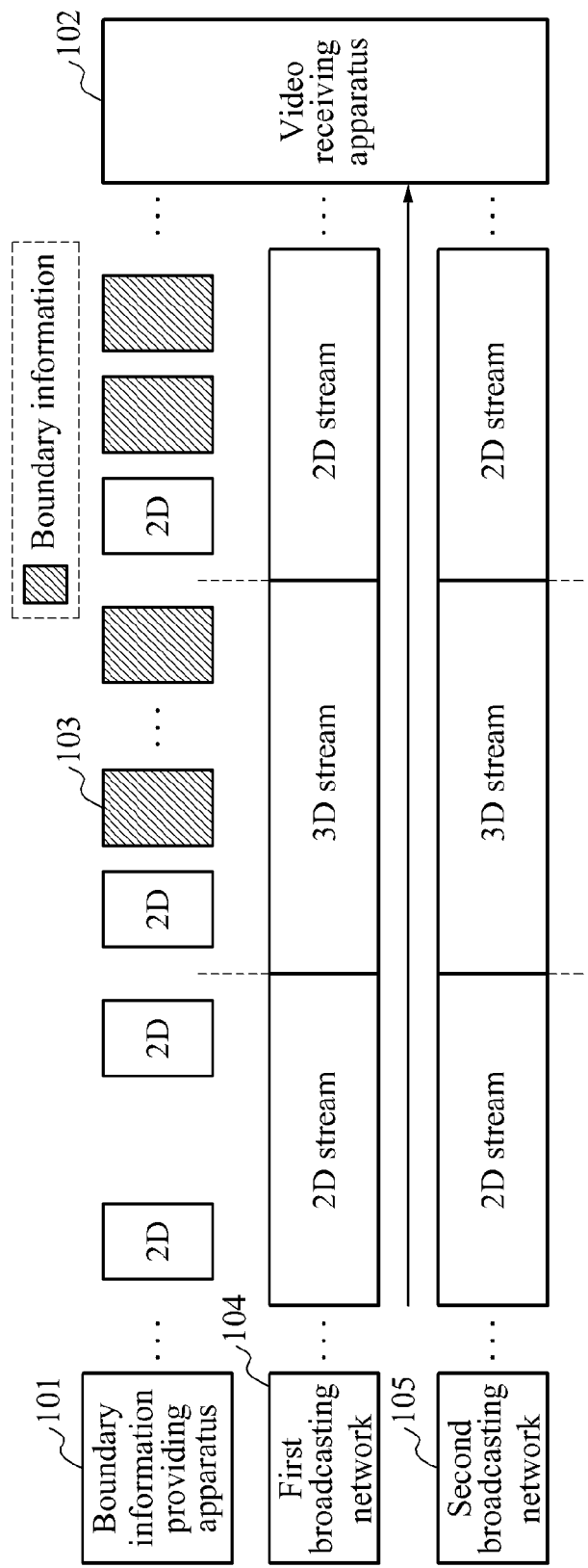
FIG. 1 is a diagram illustrating a boundary information providing apparatus and a video receiving apparatus, according to an embodiment of the present invention.

Reference will now be made in detail to exemplary embodiments of the present invention, examples of which are illustrated in the accompanying drawings, wherein like reference numerals refer to the like elements throughout.

FIG. 1 is a diagram illustrating a boundary information providing apparatus 101 and a video receiving apparatus 102, according to an embodiment of the present invention.

Referring to FIG. 1, the boundary information providing apparatus 101 may generate boundary information 103 through which a switching point between a two-dimensional (2D) video and a three-dimensional (3D) video may be recognized. The boundary information 103 may include information on whether a video provided to the video receiving apparatus 102 is a 2D video or a 3D video based on a conversion mode of the 2D video and the 3D video. The boundary information 103 may be generated based on any one of a transport level descriptor mode and a video frame header information mode, according to a method of switching to the 2D video and the 3D video.

In the transport level descriptor mode, the boundary information providing apparatus 101 may insert, in a descriptor, service type information indicating whether a program currently provided to the video receiving apparatus 102 is a 2D video or a 3D video. Here, the service type information may be inserted in the form of a field. For example, the transport level descriptor mode may signal the service type information through the descriptor such as program map table (PMT), virtual channel table (VCT), and service information (SI), using a transport level.

In the video frame header information mode, the boundary information providing apparatus 101 may insert service type information in a video frame header. The service type information may indicate whether a frame payload of the video frame header is information for the 2D video or information for the 3D video. In addition, the video frame header information mode may include the service type information of the descriptor, transmitted by the descriptor.

The boundary information providing apparatus 101 may transmit a stream including the boundary information 103 to the video receiving apparatus 102.

The video receiving apparatus 102 capable of receiving a program including both the 2D video and the 3D video may receive a transmission stream from a first broadcasting network 104 and a second broadcasting network 105, the transmission stream related to a left eye image and a right eye image. Also, the video receiving apparatus 102 may provide the program as the 2D video and the 3D video to the user based on the received transmission stream. In detail, the video receiving apparatus 102 may switch the video into the 2D video and the 3D video according to the service type information received from the transmission stream. The service type information of the video may include information on whether the video provided by the video receiving apparatus 102 is the 2D video or the 3D video.

In addition, the video receiving apparatus 102 may extract the boundary information 103 included in the transmission stream by receiving the transmission stream from the boundary information providing apparatus 101. The video receiving apparatus 102 may switch the video from the 2D video to the 3D video or from the 3D video to the 2D video, in consideration of a switching mode of the extracted boundary information. Also, the video receiving apparatus 102 may switch the video provided as the 2D video or the 3D video to the 3D video or the 2D video, respectively, at a proper time based on the boundary information including the switching point of the video.

Figure 2:
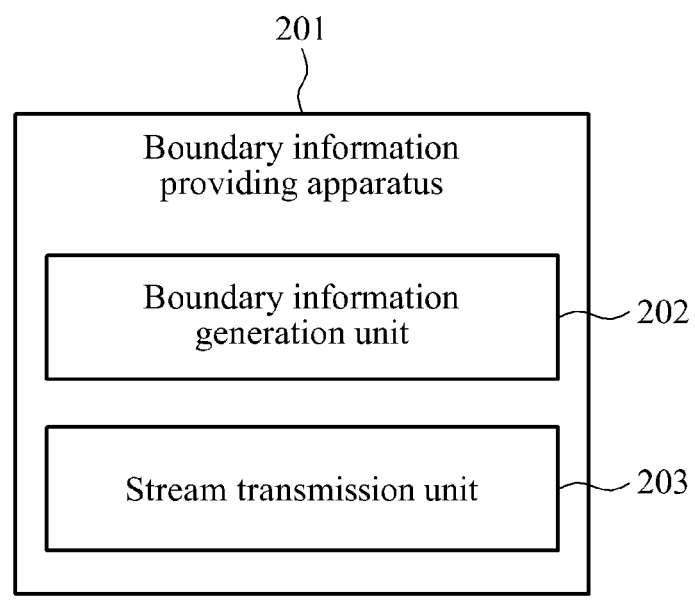
FIG. 2 is a diagram illustrating a boundary information providing apparatus according to an embodiment of the present invention.

FIG. 2 is a diagram illustrating a boundary information providing apparatus 201 according to an embodiment of the present invention.

Referring to FIG. 2, the boundary information providing apparatus 201 may include a boundary information generation unit 202 and a stream transmission unit 203.

The boundary information generation unit 202 may generate boundary information of a video through which a switching point of a 2D video and a 3D video may be recognized, in consideration of a switching mode of the 2D video and the 3D video. Here, since a configuration and a processing method of the boundary information with respect to the 2D video and the 3D video are varied according to a switching method of the 2D video and the 3D video, the boundary information generation unit 202 may consider the switching mode of the 2D video and the 3D video when generating the boundary information. Accordingly, the boundary information generation unit 202 may use a transport level descriptor or video frame header information. According to whether the video frame header information is used in addition to the transport level descriptor or not, the boundary information generation unit 202 may determine the switching mode to be the transport level descriptor or the video frame header information. For example, when using only the transport level descriptor, the boundary information generation mode 202 may determine the switching mode of the 2D video and the 3D video to be the transport level descriptor mode. When using the video frame header information in addition, the boundary information generation mode 202 may determine the switching mode of the 2D video and the 3D video to be the video frame header information mode.

In addition, the boundary information generation unit 202 may generate the boundary information in the transport level descriptor mode or the video frame header information mode, in consideration of the switching mode being determined.

When the boundary information generation unit 202 generates the boundary information in the transport level descriptor mode, the service type information is transmitted through the descriptor such as PMT, VCT, and SI. Therefore, the service type information related to whether the video is the 2D video or the 3D video may be inserted in the descriptor in the form of the field. Here, the video may denote a video being provided to the video receiving apparatus 201. That is, the boundary information generation unit 202 may insert the service type information on whether the currently provided program is the 2D video or the 3D video, in the descriptor in the form of the field.

When the boundary information generation unit 202 generates the boundary information in the video frame header information mode, since the service type information is transmitted through the descriptor such as PMT, VCT, and SI, the boundary information generation unit 202 may insert the service type information on whether the video is the 2D video or the 3D video in the descriptor in the form of the field. Additionally, the boundary information generation unit 202 may generate service type information indicating whether a particular frame is the 2D video or the 3D video, in the form of a video frame header. That is, the boundary information generation unit 202 may generate the service type information indicating whether the particular frame is provided as the 2D video or the 3D video in the form of information included in the video frame header.

For example, the boundary information generation unit 202 may generate information in the form of the descriptor, such as frame_packing_arrangement_data of moving picture expert group (MPEG)-2, to insert the service type information in the video frame header. When the video frame uses the aforementioned descriptor in the 2D video, the boundary information generation unit 202 may insert a value of arrangement_type in the descriptor as '0001000' denoting the 2D video. In addition, when the video frame uses the aforementioned descriptor in the 3D video, the boundary information generation unit 202 may generate the boundary information by not including the descriptor such as frame_packing_arrangement_data in the video frame header or by allocating arrangement_type denoting the 3D video.

As another example, the boundary information generation unit 202 may express whether the frame is the 2D video or the 3D video using user_data of the video frame header in closed caption information or express in the form of bar data in a picture.

The boundary information generation unit 202 may insert information on the switching mode of the 2D video and the 3D video. For example, the boundary information generation unit 202 may define a field name 'transition_mode' in the descriptor for the 3D program and insert the information on the switching mode of the 2D video and the 3D video in the form of the field together with other service information. In addition, the boundary information generation unit 202 may include the information on the switching mode of the 2D video and the 3D video by adjusting a value of 'transition_mode.' For example, the boundary information generation unit 202 may insert the information on the switching mode so that the value '0' of 'transition_mode' is recognized to be the transport level descriptor mode and the value '1' of 'transition_mode' is recognized to be the video frame header information mode. When the switching mode is thus signaled, the video receiving apparatus may recognize the switching mode in advance, thereby saving an unnecessary process. For example, when a switching mode of a currently transmitted stream is recognized to be the transport level descriptor mode through switching mode signaling, the video receiving apparatus may determine 2D-to-3D switching by only checking the descriptor of the transport level, without searching for the video level header. Insertion of the information on the switching mode in the descriptor is illustrated in Table 1.

TABLE 1

| Syntax | No. of Bits | Format |
|---|---|---|
| MDTV_Hybrid_Stereoscopic_Service_Descriptor( ) { | | |
|     descriptor_tag | 8 | uimsbf |
|     descriptor_length | 8 | uimsbf |
|     reserved | 5 | '11111' |
|     stereoscopic_service_type | 3 | bslbf |
|     if (stereoscopic_service_type == '001' ) { | | |
|         MDTV_service_id | 16 | uimsbf |
|         reserved | 3 | '111' |
|         transition mode | 1 | bslbf |
|         MDTV_crop_mode | 2 | bslbf |
|         VEI_flag | 1 | bslbf |
|         leftview_flag | 1 | bslbf |
|         offset_sign_bit | 1 | bslbf |
|         timestamp_offset | 32 | uimsbf |
|         if(VEI_flag){ | | |
|             reserved | 5 | '11111' |
|             VEI_type | 3 | bslbf |
|         } | | |
|     } | | |
| } | | |

However, the switching mode signaling may be selectively used depending on cases. When signaling of the switching mode is not performed, the embodiment of the present invention may basically comply with the transport level descriptor mode while selectively complying with the video frame header information mode. That is, the boundary information providing apparatus may transmit the 2D-to-3D service type information according to the transport level descriptor mode and may selectively transmit the 2D-to-3D service type information of a frame level according to the video frame header information mode. When using the method of complying with the video frame header information mode, the video receiving apparatus may support 2D-to-3D switching of the frame level. When the video receiving apparatus supports only the transport level descriptor mode, 2D-to-3D switching may be supported using the descriptor information of the transport level although the video receiving apparatus may not use the service type information of the video frame header.

The stream transmission unit 203 may insert the boundary information generated according to the switching mode in the transmission stream. In detail, the stream transmission unit 203 may insert the boundary information by performing multiplexing corresponding to the switching mode of the 2D video and the 3D video. A time point to insert the boundary information with respect to the transmission stream may be varied according to the switching mode. For example, the stream transmission unit 203 may insert the boundary information in the transmission stream at different time points according to whether the switching mode is the transport level descriptor mode or the video frame header information mode. The insertion time point will be described in detail with reference to FIGS. 3 and 4.

The stream transmission unit 203 may transmit switching mode information indicating a configuration and a processing method for the boundary information, by including the switching mode information in the descriptor in the transmission stream. Here, the switching mode information may be transmitted as included in signaling other than the transmission stream.

The stream transmission unit 203 may transmit the transmission stream including the boundary information generated according to the switching mode, to the video receiving apparatus.

A boundary information providing apparatus of a three-dimensional (3D) broadcasting, the apparatus comprising: a boundary information detection unit to detect boundary information with respect to a 3D video period by receiving an input of scheduling information of the 3D video period or by extracting additional information of a video stream; a broadcasting boundary signaling insertion unit to insert broadcasting boundary signaling according to a transport level descriptor mode corresponding to the detected boundary information; and a stream transmission unit to transmit a transmission stream including the broadcasting boundary signaling to a video receiving apparatus.

The boundary information providing apparatus the broadcasting boundary signaling insertion unit inserts the broadcasting boundary signaling so that a descriptor indicating that a currently provided broadcasting program is a of a two-dimensional (2D) video is switched to a 3D program descriptor after a start of a 3D video period in the video receiving apparatus, and inserts the broadcasting boundary signaling so that the descriptor indicating that a currently provided broadcasting program is the 3D video is switched to a 2D program descriptor before an end of the 3D video period in the video receiving apparatus.

Figure 3:
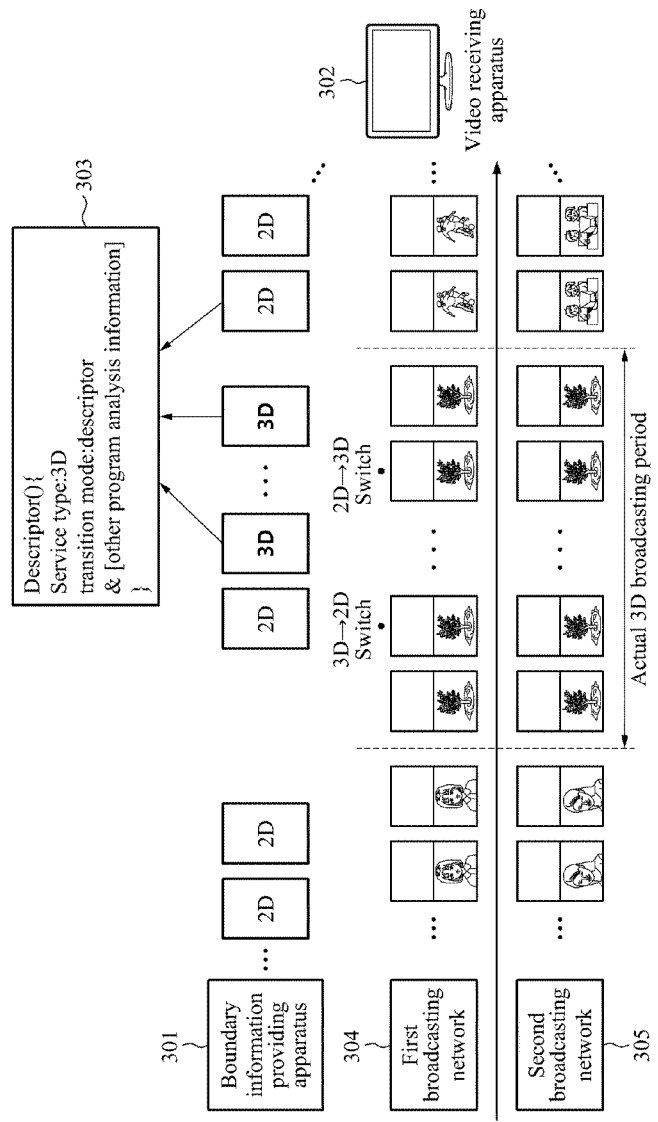
FIG. 3 is a diagram illustrating a transport level descriptor mode according to an embodiment of the present invention.

FIG. 3 is a diagram illustrating a transport level descriptor mode according to an embodiment of the present invention.

Referring to FIG. 3, a boundary information providing apparatus 301 may insert boundary information 303 in a transmission stream according to the transport level descriptor mode. a boundary information providing apparatus 301 may transport boundary information 303 inserted transmission stream through a first broadcasting network 304. In detail, when the descriptor is switched from the 2D video to the 3D video based on the transport level descriptor mode, the boundary information providing apparatus 301 may insert the boundary information 303 at a time point after a broadcasting program stream of the 3D video so that the boundary information 303 is transmitted after transmission of the 3D video broadcasting stream. For example, the descriptor informing that a program or video currently provided by the video receiving apparatus 302 is the 2D video may be actually switched to a descriptor of the 3D video after the broadcasting program stream of the 3D video is transmitted. To be specific, the switching point may be determined with reference to a boundary of a 3D period in which the 3D video is actually provided in the 3D video broadcasting program. Therefore, in the transport level descriptor mode, the boundary information providing apparatus 301 may perform 2D-to-3D switching after the 3D period of the transmission stream actually started.

Conversely, when the descriptor is switched from the 3D video to the 2D video based on the transport level descriptor mode, the boundary information providing apparatus 301 may insert the boundary information 303 at a time point before the 3D video broadcasting stream is ended. For example, the descriptor informing that the currently provided program or video is the 3D video may be switched to the descriptor of the 2D video actually before the 3D video broadcasting program is ended. For example, when the descriptor is switched from the 3D video to the 2D video based on the transport level descriptor mode, the boundary information providing apparatus 301 may perform 3D-to-2D switching before the end of the 3D period.

That is, when the boundary information 303 is generated in the transport level descriptor mode, the boundary information providing apparatus 301 may insert the boundary information 303 in a period of the transmission stream being provided as the 3D video. Thus, since the 2D and 3D switching signaling through the descriptor of the transport level occurs within the transmission stream provided as the 3D video, when a 3D service is provided using only two different 2D broadcasting networks, a receiver may be prevented from synthesizing a 3D video by two totally different 2D videos.

A boundary information providing apparatus according to another embodiment of the present invention may include a boundary information detection unit, a broadcasting boundary signaling insertion unit, and a stream transmission unit.

The boundary information detection unit may detect a 3D video period by being input with scheduling information of the 3D video period from a user or another device, or by extracting additional information of a video stream.

The broadcasting boundary signaling insertion unit may insert broadcasting boundary signaling according to the transport level descriptor mode corresponding to the detected boundary information. In detail, when transmitting the stream, the broadcasting boundary signaling insertion unit may insert and transmit 2D-to-3D switching signaling using the descriptor of the transport level after the corresponding 3D video period starts. Also, the broadcasting boundary signaling insertion unit may insert and transmit 3D-to-2D switching signaling using the descriptor of the transport level before the 3D video period ends. Here, the boundary information providing apparatus may perform signaling of the transport level so that the start and the end of the actually detected 3D video period is most approximate to the time points of 2D-to-3D switching and 3D-to-2D switching of the video receiving apparatus. Alternatively, to prevent synthesis of the 3D video from the different left and right 2D videos, the boundary information providing apparatus may insert and transmit the 2D-to-3D signaling at a predetermined time after the actual start of the 3D video period, and insert and transmit the 3D-to-2D signaling at a predetermined before the actual end of the 3D video period.

Signaling with respect to the 2D-to-3D switching point or the 3D-to-2D switching point using the descriptor of the transport level may be performed through the service type information in the descriptor or according to presence of a descriptor related to the 3D video. For example, when a predetermined particular descriptor indicating the 3D service is present in the stream, this may indicate that the 3D service is being provided. When the predetermined particular descriptor indicating the 3D service is absent from the stream, this may indicate that the 2D service is being provided.

The stream transmission unit may transmit the transmission stream including the broadcasting boundary signaling to the video receiving apparatus.

The video receiving apparatus 302 may receive a left eye image and a right eye image through a first broadcasting network 304 and a second broadcasting network 305 and may provide the 2D video or the 3D video with reference to the received left eye image and right eye image. Here, the video receiving apparatus 302 may switch an output type of the stream to 2D or 3D based on the service type information of the boundary information 303 received from the boundary information providing apparatus 301. The video receiving apparatus 302 may switch the stream output type to 2D or 3D at a proper time according to the service type information of the boundary information 303. Therefore, a broadcasting delay that may occur during switching is minimized FIG. 4 is a diagram illustrating a video frame header information mode according to an embodiment of the present invention.

Figure 4:
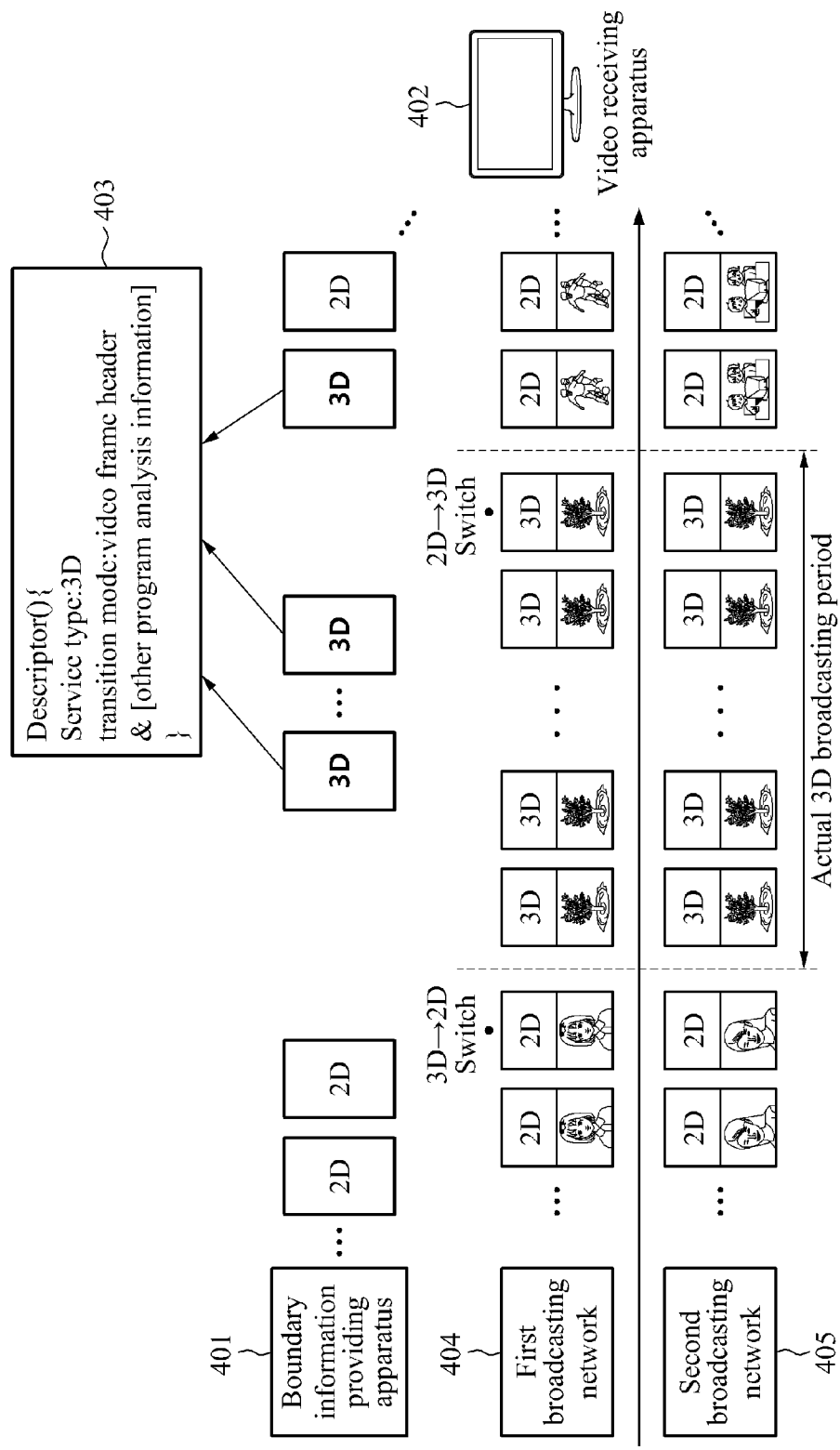
FIG. 4 is a diagram illustrating a video frame header information mode according to an embodiment of the present invention.

Referring to FIG. 4, a boundary information providing apparatus 401 may insert boundary information 403 in a transmission stream in the form of video frame header information. a boundary information providing apparatus 401 may transport boundary information 403 inserted transmission stream through a first broadcasting network 404. In detail, when the video frame header information mode is used, the boundary information providing apparatus 401 may insert the boundary information 403 through the descriptor of the transport level before the actual start of the 3D program period or after the actual end of the 3D program, so that switching from the 2D video to the 3D video or from the 3D video to the 2D video is actually performed at the boundary of the broadcasting program stream of the 3D video. That is, when the video frame header information mode is used, the descriptor of the transport level informing that the program is the 3D video may be inserted in the transmission stream before the broadcasting program period of the 3D video actually starts and be signaled. In addition, the descriptor of the transport level informing that the program is the 2D video may be actually transmitted after the broadcasting program period of the 3D video is ended.

In addition, signaling with respect to the 2D-to-3D switching point or the 3D-to-2D switching point through the descriptor of the transport level may be performed using the service type information in the descriptor or according to presence of a predetermined particular descriptor indicating the 3D video. For example, when a predetermined particular descriptor indicating the 3D service is present in the stream, this may indicate that the 3D service is being provided. When the predetermined particular descriptor indicating the 3D video is absent from the stream, this may indicate that the 2D service is being provided.

Besides the signaling through the descriptor of the transport level, the video frame header information mode may additionally signal the service type to the video frame header for accurate transmission of the boundary information of the frame level. For example, the boundary information providing apparatus 401 may include a descriptor such as frame_packing_arrangement_data of MPEG-2 in the video frame header to insert the service type information of the video frame header. In addition, when the video frame uses the aforementioned descriptor in the 2D video, the boundary information providing apparatus 401 may insert a value of arrangement_type in the descriptor as '0001000' denoting the 2D video. In addition, when the video frame uses the aforementioned descriptor in the 3D video, the boundary information providing apparatus 401 may transmit boundary information by not including the descriptor such as frame_packing_arrangement_data in the video frame header or by allocating arrangement_type denoting the 3D video.

As another example, the boundary information generation unit may transmit whether the frame is the 2D video or the 3D video using user_data of the video frame header in the closed caption information or transmit in the form of bar data in a picture.

The video frame header information mode may be different from the transport level descriptor mode. In detail, the service type information transmitted through the video frame header may correspond to a period in which the 3D video broadcasting program is actually provided. That is, in providing the video, the video frame header information mode may accurately define the boundary of the 3D frames.

In addition, in the video frame header information mode, in the period providing the descriptor of the 3D video, switching from the 2D video to the 3D video or from the 3D video to the 2D video may be performed according to the header information of the video frame. In the video frame header information mode, in a period providing a 3D type descriptor in the transport level, priority of the service type information of the video frame header may be higher than priority of the descriptor of the transport level. Therefore, switching from the 2D video to the 3D video may be performed flexibly. For example, the video receiving apparatus 402 may regard the current frame as the 3D video when the descriptor indicating that the currently provided service is the 3D video is transmitted in the transport level and when the video frame header include no data. When the video frame header includes data obviously indicating the 2D video, the current frame may be regarded as the 2D video.

The video frame header information mode may be useful when frequent switching is required, such as when 2D advertisement is included in the 3D video.

The video receiving apparatus 402 may receive the left eye image and the right eye image through a first broadcasting network 404 and a second broadcasting network 405, and may provide the user with the 2D video or the 3D video with reference to the left eye image and the right eye image. Here, the video receiving apparatus 402 may perform switching between the 2D video and the 3D video so that the period actually providing the 3D video broadcasting program corresponds to video based on the service type information of the boundary information 403 received from the boundary information providing apparatus 401.

Figure 5:
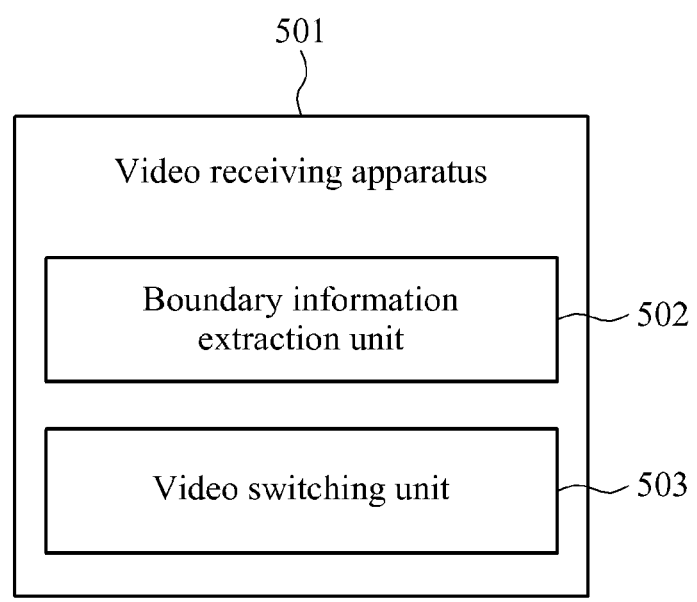
FIG. 5 is a diagram illustrating a video receiving apparatus according to an embodiment of the present invention.

FIG. 5 is a diagram illustrating a video receiving apparatus 501 according to an embodiment of the present invention.

Referring to FIG. 5, the video receiving apparatus 501 may include a boundary information extraction unit 502 and a video switching unit 503.

The boundary information extraction unit 502 may receive a transmission stream from a boundary information providing apparatus and extract boundary information included in the transmission stream. Here, the boundary information extraction unit 502 may extract the boundary information generated according to the transport level descriptor mode or the boundary information generated according to the video frame header information mode.

For example, when extracting the boundary information generated according to the transport level descriptor mode, the boundary information extraction unit 502 may demultiplex a descriptor predetermined in a transport level.

As another example, when extracting the boundary information generated according to the video frame header information mode, the boundary information extraction unit 502 may demultiplex a descriptor predetermined in a transport level. In addition, the boundary information extraction unit 502 may obtain accurate 2D-to-3D boundary information of the frame level by extracting the service type information from the video frame header according to the video frame header information mode.

The image switching unit 503 may switch a video based on the extracted boundary information. In detail, the image switching unit 503 may switch a 2D video to a 3D video or from a 3D video to a 2D video according to the boundary information.

Here, switching of the 2D video to the 3D video may indicate that a 2D video program ends and a 3D video program starts. Here, the video receiving apparatus 501 may provide the 3D video program to the user automatically or manually. In case of the manual switching, the video receiving apparatus 501 may receive a user selection through a pop-up window or a dialog menu for interaction with the user or may inform that a program currently provided to the user may be provided as the 3D video through a notifying message, a logo, or the like.

In addition, switching from the 3D video to the 2D video may indicate that a 3D video program ends and a 2D video program starts. Also, in general, the video receiving apparatus 501 may automatically provide the 2D video program to the user.

When the transport level descriptor mode is used, according to another embodiment for distinguishing the service type, that is, 2D or 3D, of the currently provided broadcasting program, the image switching unit 503 may recognize the service type information related to switching of the video according to inclusion of the descriptor in the extracted boundary information. That is, the image switching unit 503 may identify the service type information according to presence of the descriptor of a predetermined transport level indicating the 3D service. For example, when the switching mode of the boundary information is the transport level descriptor mode, the image switching unit 503 may determine that the service type information is the 3D video. Also, when the descriptor of the transport level is not included in the boundary information, the service type information may be determined to be the 2D video.

When the transport level descriptor mode is used, the image switching unit 503 may switch a video output mode according to the service type information extracted from the descriptor of the transport level. In detail, in the video receiving apparatus 501 reproducing a 2D program, when receiving the descriptor of the transport level indicating that the currently provided program is 3D, the image switching unit 503 may switch the 2D video to the 3D video corresponding to the descriptor. In the video receiving apparatus 501 reproducing a 3D program, when the image switching unit 503 receives the descriptor indicating that the currently provided program is 2D, the image switching unit 503 may switch the 3D video to the 2D video corresponding to the descriptor.

When the video frame header information mode is used, the image switching unit 503 may switch the image output mode according to the service type information included in the video frame header. In addition, the image switching unit 503 may determine switching between the 2D video and the 3D video according to the service type information included in the video frame header rather than the service type information included in the descriptor. In detail, the image switching unit 503 may receive the descriptor of the transport level indicating that the currently provided program is 3D and then switch the program mode from 2D to 3D at a time point at which the video frame header information is switched from 2D to 3D. In addition, in a receiving period of the transport level descriptor indicating that the currently provided program is 3D, the image switching unit 503 may switch the program mode from 3D to 2D at a time point at which the video frame header information is switched from 3D to 2D.

In addition, in the video receiving apparatus reproducing the 3D program, when receiving the descriptor of the transport level indicating that the currently provided program is 2D, the image switching unit 503 may switch the 3D video to the 2D video corresponding to the descriptor.

A video receiving apparatus comprising: a boundary information extraction unit to receive a stream from a boundary information providing apparatus and to extract boundary information included in the stream; and a video switching unit to perform switching between a three-dimensional (3D) video and a two-dimensional (2D) video based on the boundary information, wherein the boundary information includes information through which a switching point between the 2D video and the 3D video may be recognized, based on a switching mode between the 2D video and the 3D video and is generated based on at least one of a transport level descriptor mode and a video frame header information mode.

The video receiving apparatus the video frame header information mode determines switching between the 2D video and the 3D video according to service type information included in a video frame header.

Figure 6:
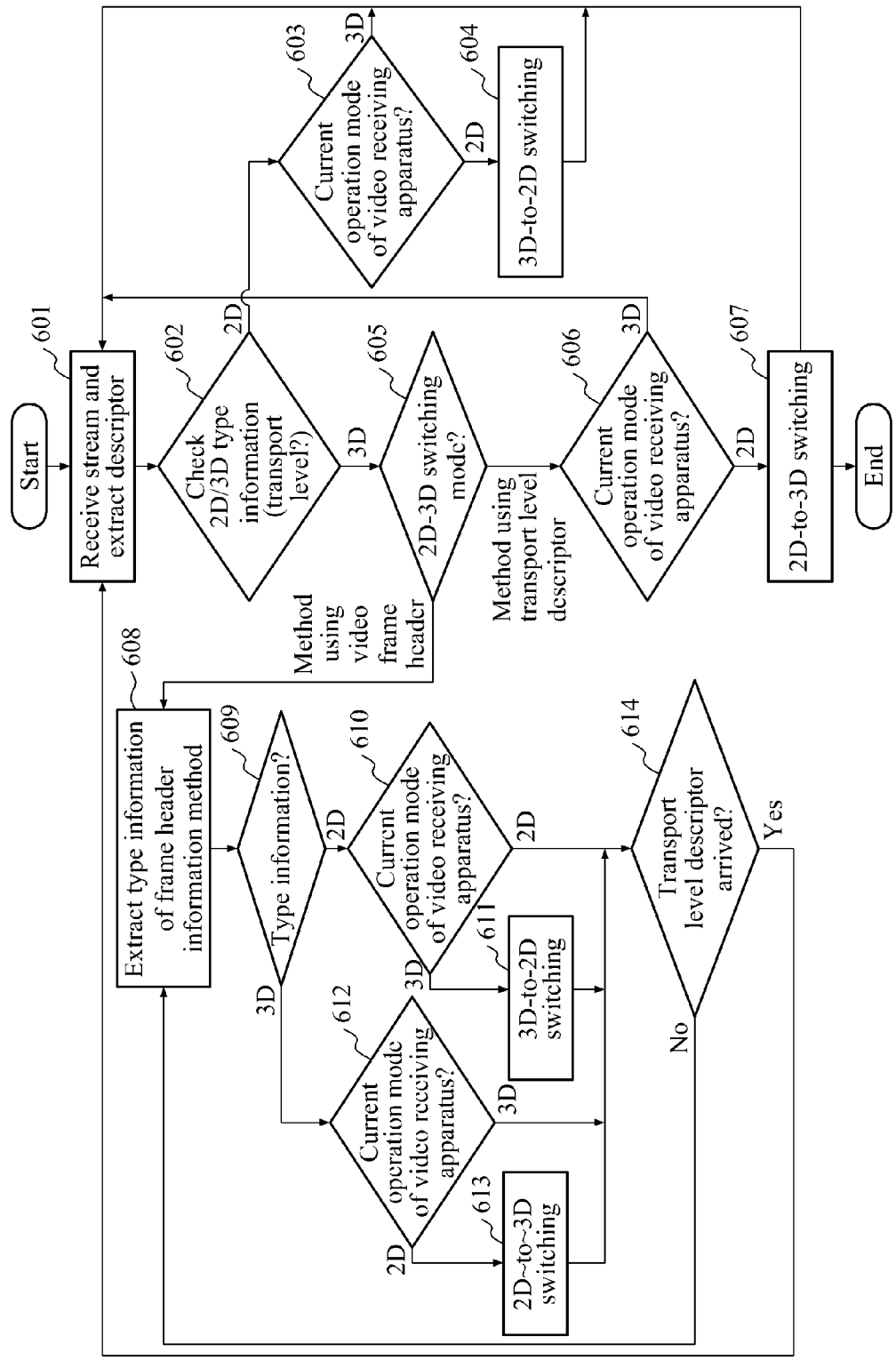
FIG. 6 is a flowchart illustrating an operation of a video receiving apparatus according to an embodiment of the present invention.

FIG. 6 is a flowchart illustrating an operation of a video receiving apparatus according to an embodiment of the present invention.

In operation 601, the video receiving apparatus may receive a transmission stream including boundary information from a boundary information providing apparatus. Additionally, the video receiving apparatus may extract service type information of a video included in the transmission stream, by demultiplexing a predetermined descriptor in a transport level. In operation 602, the video receiving apparatus may identify the service type information extracted in operation 601. The service type information may indicate whether a currently provided program is a 2D video or a 3D video.

When the service type information indicates the 2D video, the video receiving apparatus may identify a current video output mode in operation 603. That is, the video receiving apparatus may check whether the program currently provided to the user is the 2D video or the 3D video. In addition, when the currently provided program is the 3D video, the video receiving apparatus may receive a new transmission stream and extract a descriptor by performing operation 601 again.

Conversely, in operation 604, when the currently provided program is the 2D video, the video receiving apparatus may switch the 3D video of the currently provided program to the 2D video. In addition, the video receiving apparatus may receive a new transmission stream and extract a descriptor by performing operation 601 again.

When the service type information indicates the 3D video in operation 602, the video receiving apparatus may identify the 2D-to-3D switching mode signaled along with the descriptor of the transport level as shown in Table 1, in operation 605. Here, the switching mode may include the transport level descriptor mode and the video frame header information mode.

When the switching mode is the transport level descriptor mode, the video receiving apparatus may identify a providing mode of the currently provided program in operation 606. When the providing mode is the 2D video, the video receiving apparatus may switch the currently provided program from the 2D video to the 3D video in operation 607.

In addition, the video receiving apparatus may receive a new transmission stream and extract a descriptor by performing operation 601. When the providing mode is the 3D video, the video receiving apparatus may receive a new transmission stream and extract a descriptor by performing operation 601.

In operation 608, when the switching mode is the video frame header information mode, the video receiving apparatus may extract the service type information from a video frame header.

In operation 609, the video receiving apparatus may identify whether the service type information of the extracted video frame is 2D or 3D. When the service type information is the 2D, the video receiving apparatus may identify the providing mode of the currently provided program in operation 610. When the providing mode identified in operation 610 is the 3D, the video receiving apparatus may switch the currently provided program from the 3D video to the 2D video in operation 611. Next, the video receiving apparatus may check whether the descriptor of the transport level is received in operation 614. The video receiving apparatus may perform operation 601 when the descriptor is received and perform operation 608 when the descriptor is not received.

When the providing mode identified in operation 610 is the 2D video, the video receiving apparatus may check whether the descriptor of the transport level is received in operation 614. The video receiving apparatus may perform operation 601 when the descriptor is received and perform operation 608 when the descriptor is not received.

When the service type information is identified to be the 3D video in operation 609, the video receiving apparatus may identify the providing mode of the currently provided program. When the current providing mode identified in operation 612 is the 2D video, the video receiving apparatus may switch the currently provided program from the 2D video to the 3D video in operation 613. The video receiving apparatus may check whether the descriptor of the transport level is received in operation 614. The video receiving apparatus may perform operation 601 when the descriptor is received and perform operation 608 when the descriptor is not received.

When the current providing mode identified in operation 612 is the 3D video, the video receiving apparatus may check whether the descriptor of the transport level is received in operation 614. The video receiving apparatus may perform operation 601 when the descriptor is received and perform operation 608 when the descriptor is not received.

Figure 7:
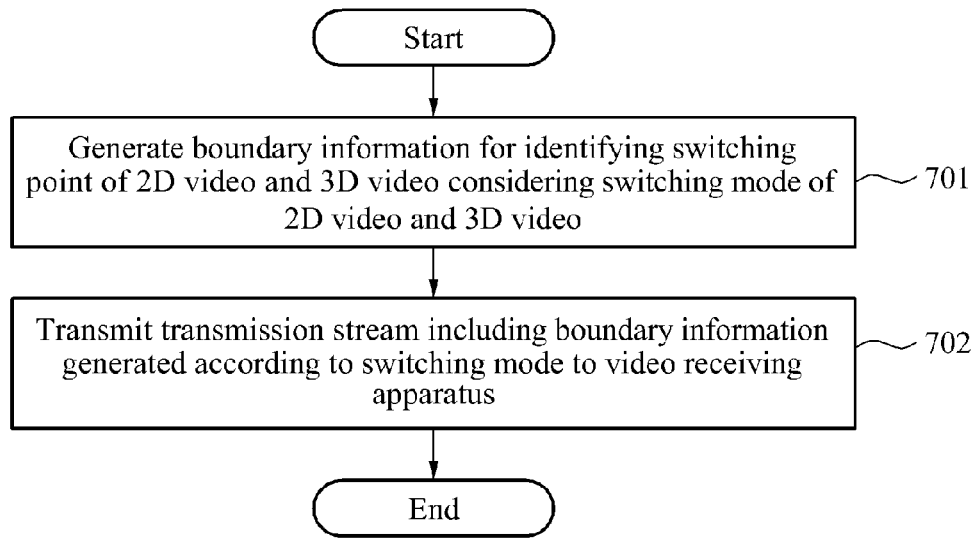
FIG. 7 is a diagram illustrating a boundary information providing method according to an embodiment of the present invention.

FIG. 7 is a diagram illustrating a boundary information providing method according to an embodiment of the present invention.

In operation 701, the boundary information providing apparatus may generate boundary information for recognizing a switching point between a 2D video and a 3D video.

Here, the boundary information providing apparatus may generate the boundary information using a transport level descriptor mode or a video frame header information mode. When the boundary information is generated in the transport level descriptor mode, the boundary information providing apparatus may insert service type information related to whether the video is the 2D video or the 3D video in the descriptor of the transport level in the form of a field. When the boundary information is generated in the video frame header information mode, the boundary information providing apparatus may insert the service type information related to whether the video is the 2D video or the 3D video in the descriptor of the transport level in the form of the field, and may generate service type information related to whether each frame is for the 2D video or the 3D video in the form of a header of the corresponding video frame.

In operation 702, the boundary information providing apparatus may insert the boundary information generated according to operation 701 in the transmission stream and transmit the transmission stream to the video receiving apparatus.

Here, the boundary information providing apparatus may insert the boundary information at different time points according to a 2D-to-3D switching mode. In detail, in the transport level descriptor mode, when the 2D video is switched to the 3D video, the boundary information providing apparatus may insert the boundary information after a time point at which a broadcasting program stream of the 3D video is transmitted, so that the boundary information is transmitted after the start of a 3D video period. In the transport level descriptor mode, when the 3D video is switched to the 2D video, the boundary information providing apparatus may insert the boundary information before the end of the 3D video. Thus, since 2D and 3D switching signaling is performed through the descriptor of the transport level in the period of the transmission stream provided as the 3D video, when the 3D service is provided using two different 2D broadcasting networks, a receiver may be prevented from synthesizing the 3D video from totally different 2D videos.

In addition, when the video frame header information mode is used, the boundary information providing apparatus may insert the boundary information through the descriptor of the transport level before the actual start of the 3D program period or after the actual end of the 3D program, so that switching from the 2D video to the 3D video or from the 3D video to the 2D video is actually performed at the boundary of the broadcasting program stream of the 3D video. That is, when the video frame header information mode is used, the descriptor of the transport level informing that the program is the 3D video may be inserted in the transmission stream before the broadcasting program period of the 3D video actually starts and be signaled. In addition, the descriptor of the transport level informing that the program is the 2D video may be actually transmitted after the broadcasting program period of the 3D video ends.

Besides the signaling through the descriptor of the transport level, the video frame header information mode may additionally signal the service type to the video frame header for accurate transmission of the boundary information of the frame level. For example, the boundary information providing apparatus may include a descriptor such as frame_packing_arrangement_data of MPEG-2 in the video frame header to insert the service type information of the video frame header. In addition, when the video frame uses the aforementioned descriptor in the 2D video, the boundary information providing apparatus may insert a value of arrangement_type in the descriptor as '0001000' denoting the 2D video. In addition, when the video frame uses the aforementioned descriptor in the 3D video, the boundary information providing apparatus may transmit boundary information by not including the descriptor such as frame_packing_arrangement_data in the video frame header or by allocating arrangement_type denoting the 3D video.

As another example, the boundary information generation unit may transmit whether the frame is the 2D video or the 3D video using user_data of the video frame header in the closed caption information or transmit in the form of bar data in a picture.

The video frame header information mode may be different from the transport level descriptor mode. In detail, the service type information transmitted through the video frame header may correspond to a period in which the 3D video broadcasting program is actually provided. That is, in providing the video, the video frame header information mode may accurately define the boundary of the 3D frames.

In addition, in the video frame header information mode, in the period providing the descriptor of the 3D video in the transport level, switching from the 2D video to the 3D video or from the 3D video to the 2D video may be performed according to the header information of the video frame. In the video frame header information mode, in a period providing a 3D type descriptor in the transport level, priority of the service type information of the video frame header may be increased than priority of the descriptor of the transport level. Therefore, switching from the 2D video to the 3D video may be performed. For example, the video receiving apparatus may regard the current frame as the 3D video when the descriptor indicating that the currently provided service is the 3D video is transmitted in the transport level and when the video frame header include no data. When the video frame header includes data obviously indicating the 2D video, the current frame may be regarded as the 2D video.

A boundary information providing method of a three-dimensional (3D) broadcasting, the method comprising: detecting boundary information with respect to a 3D video period by receiving an input of scheduling information of the 3D video period or by extracting additional information of a video stream; inserting broadcasting boundary signaling according to a transport level descriptor mode corresponding to the detected boundary information; and transmitting a transmission stream including the broadcasting boundary signaling to a video receiving apparatus.

The boundary information providing method of claim 16, wherein the inserting comprises: inserting the broadcasting boundary signaling so that a descriptor indicating that a currently provided broadcasting program is a of a two-dimensional (2D) video is switched to a 3D program descriptor after a start of a 3D video period in the video receiving apparatus; and inserting the broadcasting boundary signaling so that a descriptor indicating that the currently provided broadcasting program is the 3D video is switched to a 2D program descriptor before an end of the 3D video period in the video receiving apparatus.

Figure 8:
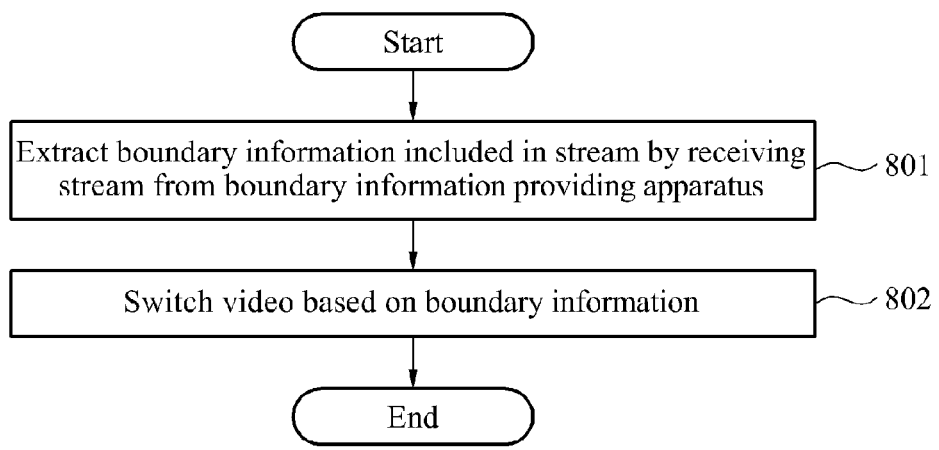
FIG. 8 is a diagram illustrating an image receiving method according to an embodiment of the present invention.

FIG. 8 is a diagram illustrating an image receiving method according to an embodiment of the present invention.

In operation 801, the video receiving apparatus may receive a transmission stream from a boundary information providing apparatus and extract boundary information included in the transmission stream. Here, the video receiving apparatus may extract the boundary information generated according to the transport level descriptor mode or the boundary information generated according to the video frame header information mode. The video receiving apparatus may extract the boundary information by demultiplexing the transmission stream.

In operation 802, the video receiving apparatus may switch a video based on the boundary information. In detail, the video receiving apparatus may switch a 2D video to 3D video or switch a 3D video to a 2D video, according to the boundary information.

Switching from the 2D video to the 3D video may indicate that a 2D video program ends and a 3D video program starts. The video receiving apparatus may provide a 3D video program to user automatically or manually. In case of manual switching, the video receiving apparatus may receive a user selection through a pop-up window or a dialog menu for interaction with the user or may inform that a program currently provided to the user may be provided as the 3D video through a notifying message, a logo, or the like.

Switching from the 3D video to the 2D video may indicate that the 3D video program ends and the 2D video program starts. Here, in general, the video receiving apparatus automatically provides the 2D video program to the user.

When the transport level descriptor mode is used, according to yet another embodiment for distinguishing the service type, that is, 2D or 3D, of the currently provided broadcasting program, the image switching unit may recognize the service type information related to switching of the video according to inclusion of the descriptor in the extracted boundary information. That is, the video receiving apparatus may identify the service type information related to the 3D video or the 3D video according to presence of the descriptor of a predetermined transport level indicating the 3D service. For example, when the switching mode of the boundary information is the transport level descriptor mode, the video receiving apparatus may determine that the service type information is the 3D video. Also, when the descriptor of the transport level is not included in the boundary information, the service type information may be determined to be the 2D video.

In addition, when the transport level descriptor mode is used the video receiving apparatus may switch the video output mode according to the service type information extracted from the transport level descriptor. In detail, the video receiving apparatus reproducing the 2D program, when receiving the descriptor of the transport level indicating that the currently provided program is 3D, the video receiving apparatus may switch the 2D video to the 3D video corresponding to the descriptor. In the video receiving apparatus reproducing the 3D program, when the video receiving apparatus receives the descriptor indicating that the currently provided program is 2D, the video receiving apparatus may switch the 3D video to the 2D video corresponding to the descriptor.

When the video frame header information mode is used, the video receiving apparatus may switch the video output mode according to the service type information in the video frame header. In addition, the video receiving apparatus may determine switching between the 2D video and the 3D video according to the service type information included in the video frame header rather than the service type information included in the descriptor. In detail, the video receiving apparatus may receive the descriptor of the transport level indicating that the currently provided program is 3D and then switch the program mode from 2D to 3D at a time point at which the video frame header information is switched from 2D to 3D. In addition, in a receiving period of the transport level descriptor indicating that the currently provided program is 3D, the video receiving apparatus may switch the program to mode from 3D to 2D at a time point at which the video frame header information is switched from 3D to 2D.

In addition, when the video receiving apparatus reproducing the 3D program receives the descriptor of the transport level indicating that the currently provided program is 2D, the video receiving apparatus may switch the 3D video to the 2D video corresponding to the descriptor.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A boundary information providing apparatus of a three-dimensional (3D) broadcasting system, the apparatus comprising: one or more processors that process computer executable program code embodied in computer readable non-transitory storage media, the computer executable program code comprising: program code that generates service type information on whether a video is the 2D video or the 3D video; and program code that transmits the service type information, wherein the boundary information between 2D and 3D is signaled based on a descriptor for PMT signaling or based on video stream signaling, wherein the descriptor is used to prevent the video receiving apparatus from synthesizing two different 2D video, wherein the service type information is signaled based on the descriptor after a start of a 3D video period in a case of 2D to 3D, when the boundary information is signaled based on a descriptor for PMT signaling, wherein the service type information is signaled based on the descriptor before an end of the 3D video period in a case of 3D to 2D, when the boundary information is signaled based on a descriptor for PMT signaling, wherein a frame_packing_arrangement_data is used to indicate whether a video frame is provided as the 2D video or the 3D video, wherein the frame_packing_arrangement_data denoting the 2D video is included in a video stream for providing, when a 2D video service, when the boundary information is signaled based on video stream signaling, wherein the frame packing arrangement data is not included in the video stream for providing a 3D video service, when the boundary information is signaled based on video stream signaling.

2. The boundary information providing apparatus of claim 1, wherein the descriptor mode transmits service type information indicating whether a program currently provided from the video receiving apparatus is the 2D video or the 3D video through the descriptor.

3. The boundary information providing apparatus of claim 1, wherein the descriptor mode indicates whether a program currently provided from the video receiving apparatus is the 2D video or the 3D video according to whether the transmission stream includes the descriptor.

4. The boundary information providing apparatus of claim 1, wherein the service type information indicating 2D or 3D is transmitted in closed caption information of a video frame header, and the service type information indicates a service type of a currently provided program.

5. The boundary information providing apparatus of claim 1, wherein the service type information indicating 2D or 3D in the form of a bar in a video provided from the video receiving apparatus.

6. The boundary information providing apparatus of claim 1, wherein the switching between 2D and 3D is performed according to presence of a particular descriptor indicating the 3D video service.

7. A boundary information providing method of a three-dimensional (3D) broadcasting system, the method comprising: generating service type information on whether a video is the 2D video or the 3D video; and transmitting service type information to a video receiving apparatus, wherein the boundary information between 2D and 3D is signaled based on a descriptor for PMT signaling or based on video stream signaling, wherein the descriptor is used to prevent the video receiving apparatus from synthesizing two different 2D video, wherein the service type information is signaled based on the descriptor after a start of a 3D video period in a case of 2D to 3D, when the boundary information is signaled based on a descriptor for PMT signaling, wherein the service type information is signaled based on the descriptor before an end of the 3D video period in a case of 3D to 2D, when the boundary information is signaled based on a descriptor for PMT signaling, wherein a frame_packing_arrangement_data is used to indicate whether a video frame is provided as the 2D video or the 3D video, wherein the frame packing arrangement data denoting the 2D video is included in a video stream for providing a 2D video service, when the boundary information is signaled based on video stream signaling, wherein the frame packing arrangement data is not included in the video stream for providing a 3D video service, when the boundary information is signaled based on video stream signaling.

8. A video receiving method comprising: extracting service type information based on a descriptor included in a stream; and performing switching between a three-dimensional (3D) video and a two-dimensional (2D) video based on the service type information, wherein the boundary information between 2D and 3D is signaled based on a descriptor for PMT signaling or based on video stream signaling, wherein the descriptor is used to prevent the video receiving apparatus from synthesizing two different 2D video, wherein the service type information is signaled based on the descriptor after a start of a 3D video period in a case of 2D to 3D, when the boundary information is signaled based on a descriptor for PMT signaling, wherein the service type information is signaled based on the descriptor before an end of the 3D video period in a case of 3D to 2D, when the boundary information is signaled based on a descriptor for PMT signaling, wherein a frame_packing_arrangement_data is used to indicate whether a video frame is provided as the 2D video or the 3D video, wherein the frame_packing_arrangement_data denoting the 2D video is included in a video stream for providing a 2D video service, when the boundary information is signaled based on video stream signaling, wherein the frame packing arrangement data is not included in the video stream for providing a 3D video service, when the boundary information is signaled based on video stream signaling.

* * * * *